Jan. 17, 1933.　　　J. BIJUR　　　1,894,658
LUBRICATION
Filed Aug. 22, 1925　　3 Sheets-Sheet 1
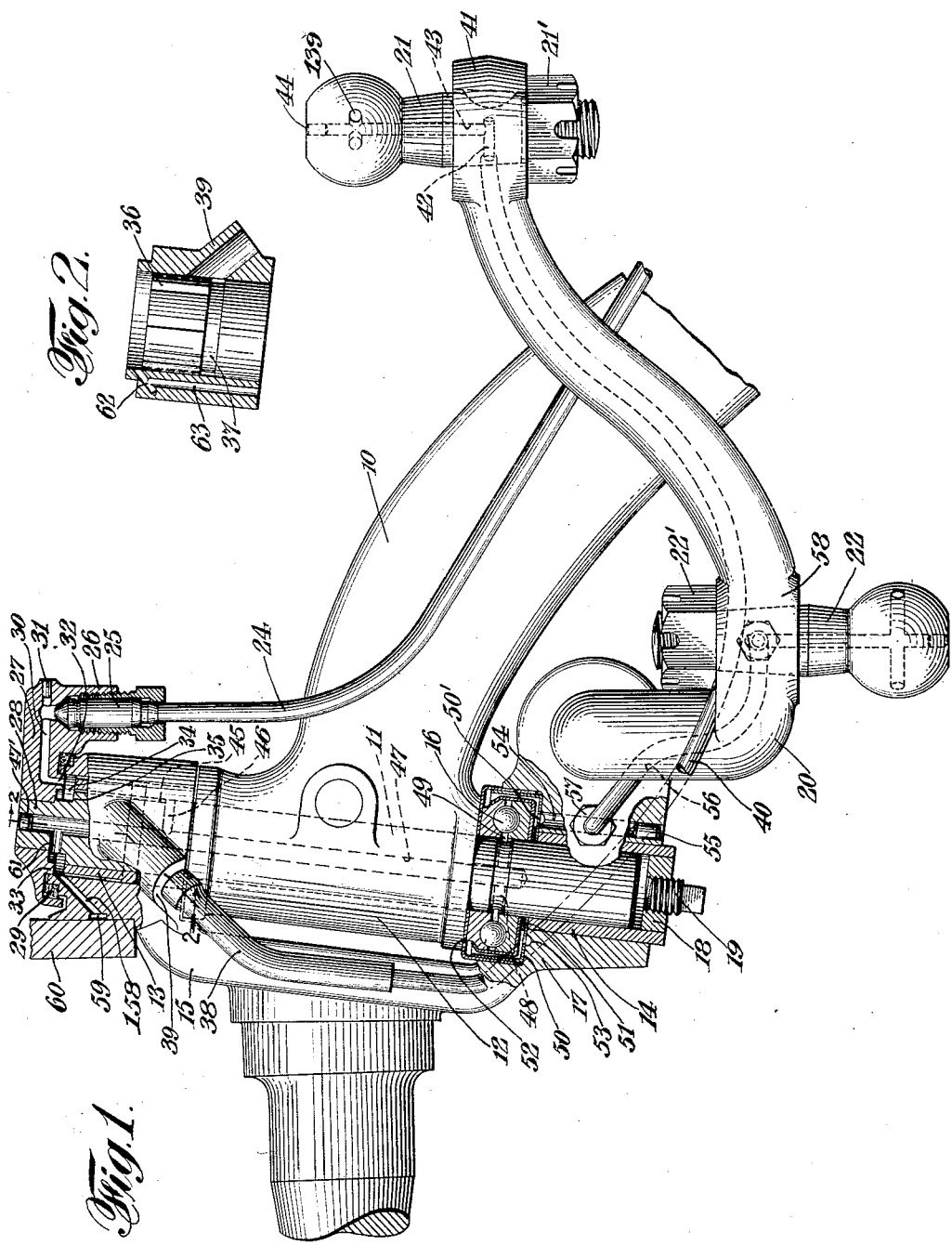
Inventor
Joseph Bijur
By his Attorneys
Dean, Fairbank, Obright & Hirsch

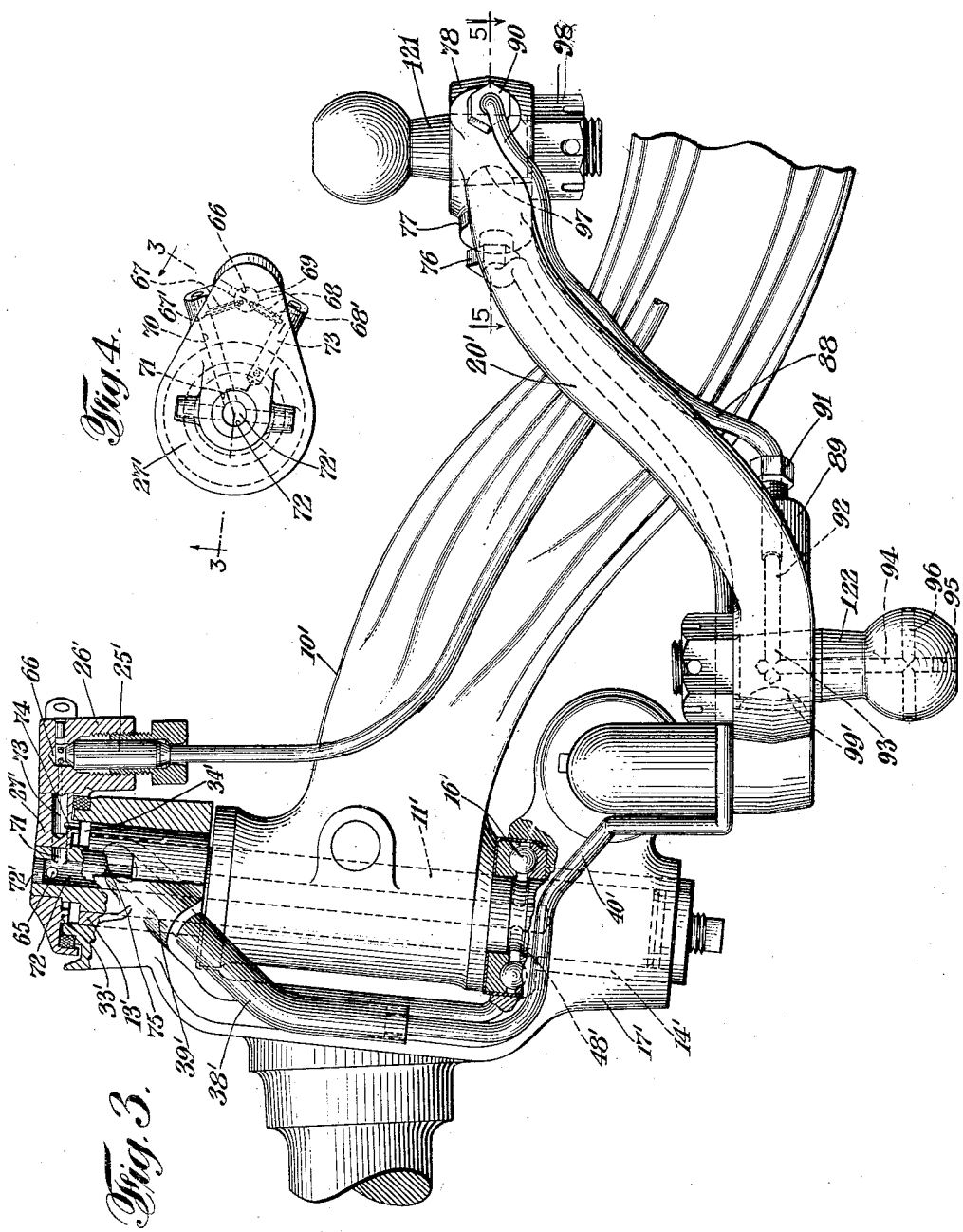

Jan. 17, 1933. J. BIJUR 1,894,658
LUBRICATION
Filed Aug. 22, 1925    3 Sheets-Sheet 3
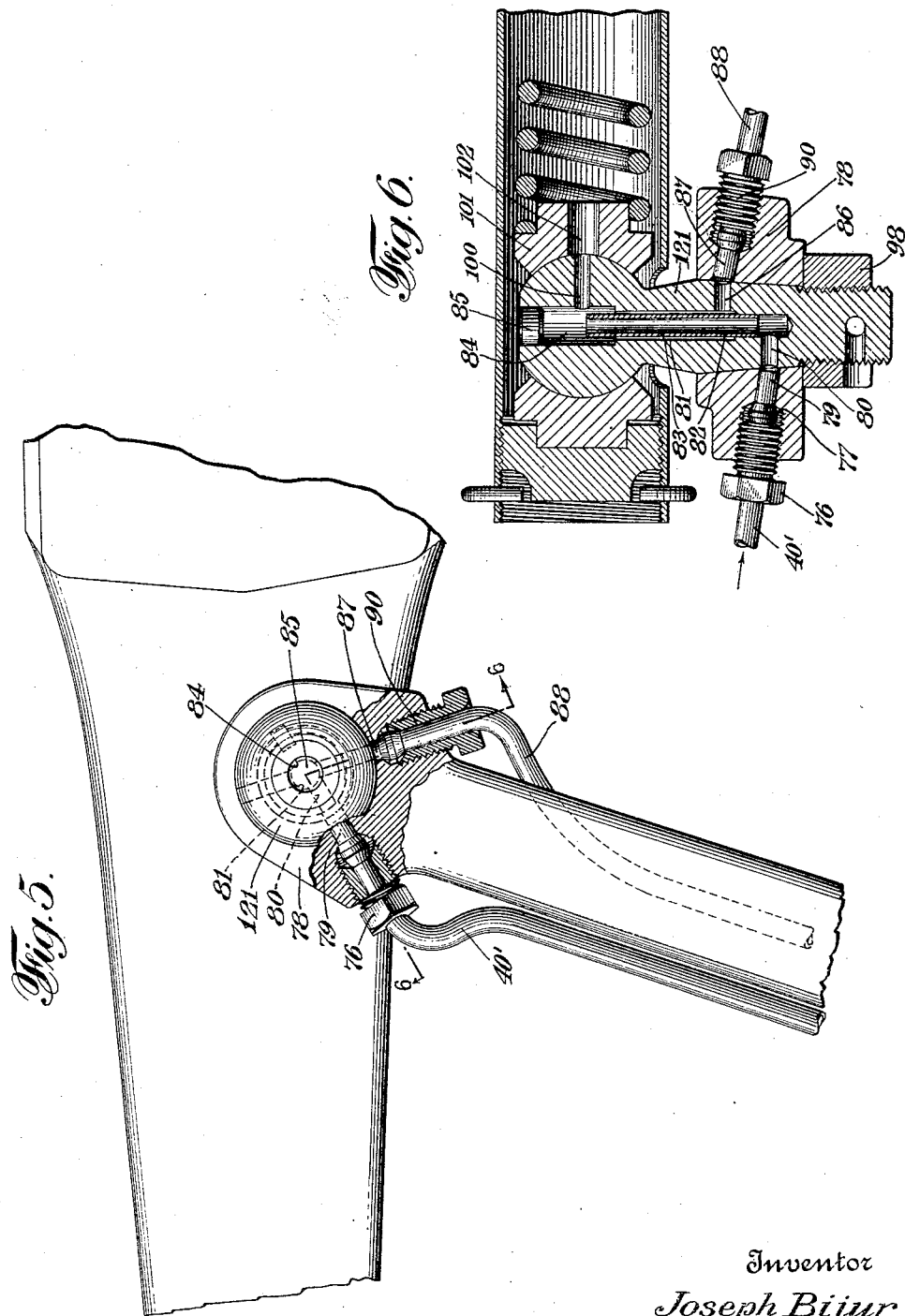
Inventor
Joseph Bijur
By his Attorneys
Dean, Fairbank, Obright & Hirsch Patented Jan. 17, 1933

1,894,658

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION

Application filed August 22, 1925. Serial No. 51,733.

My present invention is concerned with gravity flow systems of the general type described in my copending application, Serial No. 39,415, filed June 25, 1925, and in common with said invention has a preferred application in association with pressure lubricating systems, more particularly for delivering lubricant by gravity flow from a pressure line to the bearing or bearings of a structure having a swivel or other relationship to the main lubricated structure and especially where it is undesirable to convey the lubricant under pressure past or across such swivel or other connection.

The invention is shown embodied in the steering knuckle of a motor vehicle and provides convenient means for reliably supplying with clean oil, all or any number of the bearings carried by or associated with said knuckle and without the need for selective manipulation by direct manual access to the individual bearings and without the use of any protruding or projecting conduits likely to be torn loose in ordinary use of the vehicle.

Where a downwardly extending pipe line delivers by gravity flow, for instance, to the tie rod bearings of a steering knuckle, irregularity of operation might be encountered by the lubricant admitted thereto being arrested in the pipe until after several lubricating operations, a column of sufficient weight had accumulated therein, to flow out, so that the bearing would intermittently receive an oversupply of oil stored in the pipe in several intervening operations.

Where two or more bearings at different levels, for instance, the drag link and the tie rod bearings are supplied by gravity flow from a common source, there is in addition the likelihood that a siphoning action may ensue which would cause flooding of the lower bearing, drawing lubricant from the line leading to the higher, the latter, accordingly, receiving too little oil.

According to the present invention, such defective operations, both the flow arresting and the siphoning actions noted, are obviated by venting preferably the upper part of any draining conduit devoid of a lubricant trap, so that even though said conduit system be of diameter as little as $\frac{1}{8}''$ or even $\frac{1}{16}''$ bore, lubricant admitted thereto would flow out to the bearing at the lower end thereof, substantially without time lag, this because atmospheric pressure is maintained both at the upper and lower end of such conduit.

Since a vent indiscriminately located or formed in a knuckle would be subject to clogging by dust or mud splashed onto the knuckle in use of the vehicle, it is an object of the invention to arrange the vent to substantially preclude such clogging, without, however, forming it so large that foreign particles could without clogging the vent, pass therethrough to the conduits.

For this purpose, the vent is disposed in a particularly protected position and is, moreover, arranged to inherently shed any mud or dirt that might reach it, or, in the alternative, leather boots are provided about the vented parts in order to exclude dust, without, however, excluding the air requisite for venting.

In one application, the upper of the swivel bearings for the knuckle permits the free passage of lubricant to the top of the king pin from the corresponding inlet fitting carried by a contiguous part on the axle and conduits carried by the knuckle and in flow intercepting relationship with respect to lubricant that has traversed the swivel lead to the knuckle bearings. Venting is effected through a bore leading to atmosphere from the region of the upper end of the king pin, said bore extending in a downward direction through the structure and substantially protected by the brake shield or other part of or carried by the knuckle or the axle.

In one application, the generic principle set forth is applied in the passage of the lubricant from the higher drag link bearing by gravity flow to the lower tie rod bearing. Where the outlet to the drag link bearing is at level higher than other parts of the pipe or conduit leading thereto, lubricant becomes trapped therein and if those parts of the pipe or passage at the inlet end, that are above the level of the outlet are of diameter sufficiently large to prevent air blocking, satisfactory operation will occur regardless whether the upper part of such pipe is vented or unvented, or whether the oil trapping length of pipe be of small or of large diameter. In such construction, a conduit conveying lubricant from the drag link to the tie rod bearing, would be inherently vented at the drag link which while it may be provided with leather boots to exclude dust and dirt will nevertheless permit ready entry of air, so that prompt delivery of oil to the tie rod will occur even though a connecting pipe of small diameter, as little as $\frac{1}{16}''$ bore be employed.

In the accompanying drawings in which are shown one or more of various possible embodiments of the several features of the invention, Fig. 1 is a side elevation partly in section of one embodiment of the invention, Fig. 2 is a fragmentary detail sectional view taken on line 2—2 of Fig. 1 showing a modification, Fig. 3 is a view similar to Fig. 1 of another form of the invention, Fig. 4 is a plan view of part of the embodiment of Fig. 3, Fig. 5 is a view partly in section on line 5—5 of Fig. 3, and Fig. 6 is a sectional view on line 6—6 of Fig. 5.

Referring now to Figs. 1 and 2 of the drawings, I have shown a knuckle assembly comprising an axle beam 10 having a king pin 11 extending through an eye 12 thereof, protruding therebeyond and affording bearings for bushings 13 and 14 press-fitted into the jaws of a knuckle clevis 15 of substantially conventional construction. The lower bushing 14 has a plug 18 press-fitted into its lower end to prevent escape of lubricant, a screw plug 19 closing an aperture therein through which a pin may be driven for removing the king pin in disassembly. A ball thrust bearing 16 rests on the lower knuckle clevis jaw 17 and sustains the axle beam. The knuckle has rigidly secured thereto an arm 20 which in this instance, is shown curved and which has at the outer end thereof, an upwardly extending ball stud 21 taper-fitted thereinto, as shown, by pressure applied by a nut 21' threaded on the end of the stud and pressing against the arm. Intermediate the ends of the arm 20 is a ball stud 22 for the tie rod, said stud extending downward therefrom, and also taper-fitted by pressure applied by nut 22'.

According to the present embodiment, there are lubricated from a separate source both the upper and lower bearings of the king pin in their respective bushings, the ball thrust bearing 16 upon which the axle beam rests, the drag link and the tie rod bearings. To this end, the lubricant is delivered to the knuckle through a pressure-tight pipe 24 which may be of seamless metal having an outlet terminal 25 which may be a drip plug, for instance, of the type disclosed in the copending application of Edward H. Kocher, Serial No. 22,104 filed April 10th, 1925. The drip plug 25 is fitted into a downwardly extending socket 26 in a cap structure 27 rigid with the axle. The king pin is provided with a reduced upper extension 28, protruding into a tightly fitting central aperture in cap 27 which is preferably also pinned to the king pin. The cap is generally annular in construction except for the lug for the drip plug and encircles the upper end of the knuckle. An annular washer 29 is interposed between the knuckle and the cap to preclude the entry of dust to the swiveling or bearing surface, the construction of which may be the same as that fully described in my copending application, Serial No. 39,415, filed June 25, 1925. The lubricant from the drip plug passes through a bore 30 in the cap plugged at its outer end at 31 and, in turn, dripping downward through a bore 32 in an annular pilot flange 33 on the cap which fits into the upper knuckle clevis. The lubricant, accordingly, collects in the annular well 34, the bottom of which is formed by the upper end of the bushing 13 and the shoulder 35 at the base of the reduced king pin extension 28. The upper bushing is provided with a passageway, preferably formed by a plurality of longitudinal external grooves 36, which communicate with a peripheral groove 37 intermediate the ends of said bushing. The groove 37, in turn, communicates with a pipe 38 fitting at its upper end in a corresponding apertured boss 39 formed integral with the upper knuckle bearing extending downward from substantially the level of groove 37, along the structure of the knuckle to the drag link bearing.

The pipe 38 is shown of relatively large diameter, one-quarter inch bore or more, so that the lubricant can trickle downward past any air therein, said large diameter part extending down at least to the level of the outlet to the drag link stud 21. The rest of the pipe 40 which may extend, as shown, along the drag link below outlet of stud 21, may be of smaller diameter, too small to permit passing of lubricant around any air therein, in manner and for reasons fully set forth in my copending application above identified. Preferably, the outlet end of the line 40 extends radially inward at the eye 41 at which the ball stud 21 is mounted, and delivers by way of a radial bore 42 in the stud into an axial bore 43 plugged at 44 at its upper end and communicating through one or more of the radial outlet bores 139 through the ball for oiling the corresponding drag link bearing.

The king pin has a flat 45 near its upper end determining a narrow passage communicating with the well 34, a radial bore 46 in the king pin delivering lubricant therefrom into an axial bore 47 therein, which bore extends downward to substantially the level of the ball thrust bearing 16 and is plugged at the upper end at 47'. The king pin has a radial bore 48 in turn delivering to a peripheral groove 49 about the king pin, substantially at the bearing plane of the ball thrust bearing from which the latter is lubricated.

The thrust bearing is constructed so that lubricant may drain therefrom to supply the tie rod bearing. The assembled bearing is enclosed in a sheet metal capsule composed of two telescoped caps, the lower of which, (indicated by reference numeral 50) rests in the knuckle and carries a star washer 51 upon which the thrust bearing assembly rests, the axle beam resting on the upper cap 52. Such lubricant as overflows around the ball bearing passes between the teeth of the star washer through one or more apertures 50' in the cap 50, into an annular groove 53 formed in the upper surface of the lower knuckle clevis jaw, which, in turn, drains into a vertical bore 54 through the lower jaw of the clevis, said bore plugged at 55 at its lower end.

Bore 54 delivers between its ends into a pipe 56 secured by an appropriate terminal 57 to the knuckle, said pipe extending downward to eye 58 in the arm 20 which carries the tie rod ball stud 22. The latter is bored in the same manner as the drag link stud to supply lubricant to the tie rod bearing.

In the present embodiment, the bore 47 of the king pin and the pipe 56 leading to the tie rod both are made of diameter too small to permit passing of lubricant about any air therein, and if desired, as small as $\frac{1}{16}''$ bore. To facilitate free flow of the lubricant through the small conduit and to preclude stoppage of a plurality of charges therein followed by flooding of the bearing, the upper end of the knuckle is vented. In one embodiment, this vent consists of a bore 158 extending obliquely downward through the upper knuckle from the side wall of the well 34, as shown, and communicating with a shallow downwardly sloping groove 59 at the wheel side of the knuckle at which the brake shield 60 or equivalent structure is secured. I have thus disposed a vent where dust and dirt will not readily get at it and even if it should, it would drop therefrom by gravity. The king pin bore 47 and the communicating tie rod conduit 56 are effectively vented through a radial bore 61 which connects said king pin bore with the vented well 34.

In operation, lubricant admitted to the knuckle from a remote source of pressure will be forced through the drip plug 25 and will flow through the passage 30—32 into the well 34 where it divides. One part of the lubricant will pass along longitudinal grooves 36 to the peripheral groove 37 whence it escapes through the boss 39 and pipe 38 to the drag link bearing 21 by way of pipe 40 and bores 42, 43 and 139. Normally lubricant will be trapped in the pipe 40 below the level of the drag link outlet bores 39 and it will be understood that such lubricant as passes down the large pipe 38 on to the trapped lubricant, will cause the delivery of a corresponding charge at the bearing.

Another part of the lubricant from the well 34 will flow down the flat 45 through the bore 46 into the longitudinal bore 47 of the king pin. Said bore being vented through the radial bore 61, well 34 and venting aperture 58, the lubricant will readily pass down therethrough and through radial bore 48 into the ball thrust bearing 16. A small part of the lubricant will pass downward from the groove 49 along the lower king pin bearing 14 to lubricate the latter, the lubricant collecting between the plug 18 and the bottom of the king pin. Oil escaping from the ball thrust bearing passes between teeth of star washer 51 through ports 50' to groove 53, which drains through bore 54 into pipe 56 and thence into the bore of the tie rod pivot stud 22. The vent 158 maintains atmospheric pressure at the top of the king pin bore 47 and at the various pipes supplied therefrom, so that siphoning of lubricant from the king pin bearing or the drag link bearing to the tie rod bearing or from the upper king pin bearing to the drag link or from the latter to the lower king pin bearing is substantially precluded.

In Fig. 2 is shown a modification of the embodiment shown in Fig. 1 in which the venting bore in the upper knuckle clevis extends preferably obliquely at 62 but partly through the thickness of the upper knuckle and thence communicates with a longitudinal bore 63 terminating at the lower face of said clevis jaw. Inasmuch as the thrust bearing 16 is at the lower end of the axle eye, a small space will be maintained between the upper face of the axle eye 12 and the upper clevis jaw, so that the bore 63 is effectively vented thereat.

In Figs. 3 to 6 is shown another form of the invention, also embodying an axle 10' having a king pin 11' pinned therein and a thrust bearing 16' below the axle beam, by which it is sustained on the lower clevis jaw 17' of the wheel knuckle. A cap 27' generally similar to that shown in Fig. 1 mounts the flow controlling inlet, such as drip plug 25' and affords a dust-tight swivel for the upper knuckle clevis as in Fig. 1. A cavity 66 in the cap lug 26' receives the lubricant from the contiguous drip plug 25' and communicates with a pair of bores 67 and 68 radiating therefrom, and in which are lodged metal pins 67' and 68' respectively of but slightly smaller diameter. The bores are formed through the lug 26' of the cap, as shown, for insertion of the pins and then plugged at their outer ends at 69. The passage determined by the pin 67′ delivers into a downwardly sloping bore 70 through the cap, which bore is aligned with a transverse bore 71 in the king pin. This alignment may be effected by the predetermined relation of apertures for pin 65 by which the cap is locked to the upper end of the king pin. Bore 71 in the king pin delivers into the axial bore 72 thereof plugged at 72′ at its upper end and draining to thrust bearing 16′ and to the lower king pin pivot bearing 14′ as in the embodiment of Fig. 1.

The passage determined by pin 68′ communicates with a bore 73 in the cap radiating from king pin 11′ but terminating short of the axis thereof. Bore 73 delivers to well 34′ through a port 74 in the pilot flange 33′ of the cap. In this embodiment, the well 34′ communicates with an oblique notch 75 at the upper end of the upper bushing 13′ which, in turn, delivers into the upper end of the pipe 38′ fitting in a corresponding boss 39′ in the knuckle clevis. As in the embodiment of Fig. 1, pipe 38′ is of large diameter down to a level no higher than that of the drag link outlet and may be of small diameter at the part 40′ which extends below said outlet and in which lubricant is trapped. Pipe 40′ is secured by means of a compression coupling 76 into a corresponding socket 77 in the eye 78 which mounts the drag link ball stud 121. The socket 77 communicates through radial bore 79 with radial bore 80 in the stud, from which the lubricant passes to the bearing surface thereof through an axial passage.

In this embodiment, an excess of the lubricant that is delivered to the drag link bearing is allowed to overflow therefrom by gravity to the tie rod bearing. For this purpose, the axial bore 81 in the drag link bearing has press-fitted into the lower part thereof, a short vertical pipe 82 extending upward to substantially the center of the ball. The bore determines a small clearance passage 83 about the pipe 82 extending the major part of the length thereof. The upper end of pipe 82 extends into a well 84 of larger diameter bored from the upper end of the ball, said well being plugged at 85 at its outer end. A radial bore 86 through the pivot stud communicates with the lower end of the annular clearance space 83 and, in turn, delivers to a bore 87 in the eye 78 to which is connected a pipe 88 extending along the arm 20′ and connected at its lower end into a lug 89 adjacent the tie rod bearing. Compression couplings 90 and 91 respectively connect the upper end of pipe 88 to the eye 78 and the lower end into lug 89. A bore 92 through the lug 89 communicates with a radial bore 93 in the tie rod ball stud which, in turn, delivers to an axial bore 94 therein plugged at its lower end 95, from which the lubricant passes to the bearing through one or more bores 96 radially of the ball. A key 97 locks the ball stud 121 against rotary shift from predetermined position in eye 78, so that stud bores 80 and 86 will register with the corresponding bores 79 and 87 respectively in the eye 78. The nut 98 draws the taper-fitted shank of the pivot stud tight, so that lubricant will not drip in its flow into and out of the pivot stud. A key 99′ bears a similar relation to tie rod stud 122.

In operation, lubricant from a remote source is forced through the drip plug 25′ and passes therebeyond under little or no pressure through the passage determined by the two restriction pins 67′ and 68′ which determine the division of the lubricant. The lubricant that has passed pin 67′ drips through the oblique passage 70 of the cap 27′ into the bore 71—72 of the king pin and then passes radially outward at 48′ to the bearing surface of the ball thrust bearing 16′ from which the lower king pin bearing 14′ also is lubricated as in the embodiment of Fig. 1. The rest of the lubricant passes into well 34′ from bore 73 which is supplied from the other restricted passage 68. The pin 68′ is preferably of smaller diameter than pin 67′ to determine a passage of larger cross-section and of less resistance to flow, so as to pass the greater portion of the lubricant. The well 34′ drains into the notch 75 in the bushing 13′ and thence into the pipe 38′. The enlarged upper end of this pipe will prevent air blocking so that lubricant will readily deposit upon the body of trapped lubricant therebelow in pipe 40′. Lubricant overflows from the trapping pipe 40′ through radial bore 79 in the drag link eye, thence through radial bore 80 in the stud 121 upward through pipe 82 overflowing into the annular well 84. Some of the lubricant from the upper end of the pipe passes on through radial bore 100 to oil the drag link bearing and some will seep downward through the narrow annular passage 83 between the outer surface of the pipe 82 and the enclosing bore 81 and proceeds through the radial bore 86 onward through the pipe 88 to the lower or tie rod bearing. The clearance is so determined as to assure substantially correct division between the drag link and the tie rod bearings of the lubricant admitted through pipe 40′.

The drag link while sufficiently dust-tight by the use of appropriate leather boots (not shown) is by no means an air-tight construction and atmospheric pressure exists therein. By the provision of venting bore 102 in the ball cup 101, or elsewhere in communication with well 84, the upper end of pipe 88 will, accordingly, be at atmospheric pressure. Pipe 88, therefore, may be and preferably is of small diameter, of as little as $\tfrac{1}{16}''$ bore, and by reason of the vented relation, any lubricant admitted to pipe 88 will pass promptly therethrough by gravity flow to the tie rod bearing.

While in both embodiments, I have shown the invention applied to a reverse Elliott type axle, that is, to one in which the clevis on the knuckle straddles the axle, it will be understood that the general principles thereof may be readily applied to an Elliott axle, in which the clevis is on the axle and straddles the knuckle eye.

The invention is not limited in its application to remote control lubrication or to the use of a drip plug for admitting lubricant to the knuckle. An oil cup or other lubricant admitting fitting may be applied to the knuckle instead of the drip plug, for supplying the various knuckle bearings in the manner disclosed and claimed.

By the terms control, adjacent, subsidiary, carried, and/or associated bearings, as utilized in the accompanying claims is included the pivotal control bearings such as the upper and lower king pin bearing, and also the thrust bearing, which are located internally of the knuckle; the steering actuating controlling bearings such as the drag link and tie rod bearings which are located externally of the knuckle; and other bearings associated with, positioned about, or located adjacent to the knuckle which are adapted to receive lubricant from the same source that supplies said knuckle bearings proper.

It is to be understood that although the invention of the present application is illustratively described in connection with a steering knuckle of an automotive vehicle, it is broadly adaptable to the supply of lubricant to a plurality of bearings particularly at different levels, and particularly by gravity systems. Even though the invention is particularly adapted to the supply of lubricant to a plurality of bearings from a central chassis lubricating system, it is also adapted to the supply of lubricant by individual application to the several bearings of an automobile chassis.

The part of the subject-matter shown and described in the present application, but not claimed therein, is covered in the copending applications Serial No. 485,056, filed September 29, 1930 and Serial No. 39,415, filed June 25, 1925.

I claim:—

1. In a lubricating installation, in combination, a bearing, a conduit leading lubricant thereto from a turning structure at higher level, a support structure for said conduit between said first structure and said bearing, said support structure affording a dust excluding vent at said first structure to maintain the upper end of the conduit at atmospheric pressure for permitting ready gravity flow of the lubricant therethrough to supply the bearing.

2. In combination, a relatively fixed structure, a structure swiveled thereto and carrying a bearing at level below a portion of the swivel bearing therefor, a passageway on said swiveled structure extending downward from the mount thereof to said bearing and at least in part of diameter too small to permit gravity flow of lubricant therethrough about any air therein, means to prevent foreign matter from entering the passageway at said swivel, said means rendering the construction substantially air-tight during operation, and a port venting a part of said passageway.

3. In a motor vehicle, in combination, an axle, a knuckle pivotally mounted thereon, an arm rigid with said knuckle, a bearing carried thereby, a lubricant inlet rigid with said axle, a conduit carried by said knuckle and in flow intercepting relationship to lubricant from said inlet, said conduit being vented and extending downward to said bearing and having a part between the vent and the bearing of diameter too small for passage of lubricant about any air therein, all of said parts being constructed and arranged to form a substantially non-leaking passage of lubricant to said bearing.

4. In a lubricating installation, in combination, a pair of bearings at different levels, an inlet at level higher than said bearings for supplying the higher of them and a substantially vertically extending outlet conduit for delivering from the higher down to the lower of said bearings of diameter too small to permit passage of lubricant about any air therein and vented near the commencement thereof.

5. In a lubricating installation, in combination, a pair of bearings at different levels, an inlet at level higher than said bearings, a conduit supplying lubricant by gravity flow downward from said inlet to the upper of said bearings, means maintaining lubricant to a substantially predetermined level in said bearing and an overflow conduit from said bearing extending downward to the lower of said bearings, said overflow conduit being of diameter smaller than needed for passage of lubricant about any air therein and the upper end thereof being vented to assure prompt delivery of lubricant to the lower bearing.

6. In a steering knuckle, in combination, a tie rod bearing and a drag link bearing at different levels, a conduit carried by said knuckle and extending along the structure thereof to the bearing at higher level and a second conduit intercepting overflow of lubricant from said higher bearing and extending along the structure of the knuckle to the bearing at lower level.

7. In a steering knuckle, in combination, a tie rod bearing and a drag link bearing at different levels, a conduit carried by said knuckle and extending along the structure thereof to the bearing at higher level and a second conduit intercepting overflow of lubricant from said higher bearing and extending along the structure of the knuckle to the bearing at lower level, said latter conduit being of diameter too small to permit flow of lubricant about any air therein and being vented at the upper bearing.

8. A steering knuckle having, in combination, a rigid arm structure having a ball stud thereon at higher level for a drag link and a ball stud at lower level for a tie rod, a conduit carried by said knuckle and extending along the structure thereof to deliver into the shank of the higher ball stud, said shank having an axial bore extending upward to said bearing thereof, a pipe in said bore leaving clearance space through which overflow descends and a second pipe intercepting said overflow and extending along the structure of the knuckle to supply the lower bearing.

9. A steering knuckle having a rigid arm structure with a ball stud thereon at higher level for a drag link and a ball stud at lower level for a tie rod, a conduit carried by said knuckle and extending along the structure thereof to deliver into the shank of the higher ball stud, said shank having an axial bore extending upward from said inlet to the bearing thereof, a pipe in said bore communicating with said conduit and leaving clearance for overflow and a second pipe communicating with the clearance space and extending along the structure of the knuckle to supply the tie rod bearing, said second pipe being of diameter too small to permit passage of lubricant about any air therein and being vented at the drag link end thereof.

10. In a motor vehicle, in combination, an axle, a knuckle having a pivot mount thereon, a lubricant inlet rigid with said axle, piping carried by said knuckle in flow intercepting relationship with respect to lubricant from said inlet and extending along the structure of said knuckle to the drag link bearing thereof, additional piping draining excess lubricant from the drag link bearing and extending along the knuckle structure to the tie rod bearing, a substantially dust-tight swivel between the inlet carrying structure and the pivoting knuckle substantially precluding the admission of air, said first mentioned piping being of diameter sufficiently large down to substantially the level of said drag link bearing to permit passage of oil about any air therein and the rest of the piping being of diameter too small to permit passage of lubricant about any air therein.

11. In a motor vehicle, in combination, an axle, a steering knuckle pivoted thereto and having two bearings rigid therewith at different levels, a pressure absorbing lubricant inlet on said axle near the upper end of said knuckle, a piping system carried by said knuckle, and in flow intercepting relationship with respect to lubricant through said inlet, said system extending generally downward along the structure of said knuckle to the upper bearing to supply the latter with lubricant and including a conduit draining excess lubricant from the upper to the lower bearing.

12. In a motor vehicle, in combination, an axle, a steering knuckle pivoted thereon having bearings associated therewith, a single lubricant inlet carried by said axle to deliver lubricant therefrom to said bearings, said inlet being of the pressure absorbing type and restriction means in the path of flow of lubricant from said inlet, said restriction means governing the division of lubricant in its gravity flow therebeyond to the bearings.

13. In a motor vehicle, in combination, a knuckle, an axle having knuckle supporting bearings, a pressure conveying conduit having a pressure absorbing outlet fitting rigid with said axle and near the upper end of the knuckle, restriction pins in the path of lubricant flow in bores of slightly larger diameter than said pins and controlling the division of the lubricant from said inlet fitting and passageways supplied from said bores, one leading by gravity flow to a knuckle supporting bearing and the other to one of the bearings carried by the knuckle.

14. In a motor vehicle, in combination, an axle, a king pin, a knuckle about said king pin having a drag link and a tie rod bearing, said king pin affording a bearing mount at the ends thereof for said knuckle, a pressure conveying conduit having a pressure absorbing outlet fitting rigid with said axle and near the upper end of the knuckle, restriction pins in the path of flow of lubricant from said fitting, within bores of slightly larger diameter than said pins and controlling the division of the lubricant from said inlet fitting, one of said restricted bores feeding lubricant to said king pin, a conduit communicating with the other restricted bore and extending along the structure of said knuckle to the drag link bearing, and another conduit intercepting overflow from said drag link bearing and extending downward therefrom along the structure of the vehicle to the tie rod bearing.

15. In a motor vehicle, in combination, an axle, a king pin therethrough and pinned thereto, a knuckle having a clevis bearing on the ends of said king pin, a restriction inlet cap fixed with respect to said king pin and affording a dust-tight swivel for said knuckle, a lubricant inlet fitting of the pressure absorbing type carried by said cap, a pair of restriction pins in said cap affording flow controlling clearance to determine the division of lubricant from said inlet fitting, one of said restriction passages delivering through the lower face of said cap to the upper bearing of the king pin and to a conduit on said knuckle in flow intercepting relationship therewith extending along the structure of the knuckle to supply bearings thereof and the other of said restriction passages connecting with a longitudinal bore in said king pin, which, in turn, communicates with bearings thereof.

16. In a lubricating installation, in combination, a swiveled structure carrying one or more bearings, means for supplying lubricant thereto from a remote source comprising a conduit terminating at a fixed part adjacent said swiveled structure and above the bearings thereon, means on said structure intercepting lubricant from said conduit, a conduit system carried by said swiveled structure and leading downward to the bearing or bearings thereof including a conduit of diameter too small to permit passage of lubricant about any air therein and means venting the upper end of said small conduit to allow ready flow of lubricant therethrough.

17. In a motor vehicle, in combination, an axle, a knuckle pivoted thereto carrying one or more bearings rigid therewith, a pressure transmitting pipe line having a terminal adjacent the upper end of the pivot mount of said knuckle, valve means normally closed to prevent the passage of fluid from said pipe line past said terminal but adapted to open under the pressure transmitted through said pipe line to deliver lubricant at low pressure intercepting means on said knuckle being arranged to receive lubricant transmitted past the valve, a dust and air tight closure protecting said intercepting means, a conduit system on said knuckle draining the intercepted lubricant downward to the bearings thereof having a conduit of diameter too small to permit passage of lubricant about any air therein and means venting the said conduit system.

18. In a steering knuckle, in combination, an axle, a king pin fixed in an eye thereof, a steering knuckle having a clevis the jaws of which have bearings encircling the upper and lower ends of said king pin, a thrust bearing about the king pin between the lower clevis jaw and the axle eye, said lower bearing being sealed at its lower end below said king pin and means for lubricating said king pin bearings comprising a lubricant well above said king pin, passages through said king pin delivering lubricant therefrom to said lower bearing past said thrust bearing.

19. In a vehicle of the type incuding an axle and a steering knuckle having a pivotal mount thereon; the combination therewith of a lubricating installation for associated bearings about said steering knuckle, a conduit system including separate conduits along the outside, and through the inside, of the pivotal mount conveying lubricant to associated bearings, a lubricant source adjacent the upper part of the pivotal mount and collectors adjacent the upper and lower portions one associated with each of said separate conduits of said pivotal mount receiving lubricant from said source and dispensing it, respectively, to said bearings by said conduit system.

20. In a vehicle of the type including an axle and a steering knuckle having a pivotal mount thereon; the combination therewith of a lubricating installation for associated bearings about said steering knuckle, conduit systems adapted to supply lubricant to upper and lower of said associated bearings, a collecting well adjacent the upper part of the king pin and a collecting groove adjacent the lower part of said king pin, said collecting means cooperating, respectively, with said upper and lower conduit systems to receive and dispense lubricant to said bearings.

21. In a vehicle of the type including an axle, a king pin fixed in said eye and protruding on both sides thereof, a steering knuckle having a clevis, the jaws of which encircle and bear upon the protruding upper and lower ends of said king pin and a thrust bearing about the king pin between the lower clevis jaw and the axle eye; the combination therewith of a lubricating installation for the king pin and thrust bearings comprising an axial bore downwardly through said king pin to the level of the thrust bearing, an inlet cap to admit lubricant to the top of said axial bore covering the upper king pin bearing and a circumferential groove encircling the king pin at said thrust bearing and radial bores establishing communication between said axial bore and said circumferential groove, said groove supplying lubricant to said thrust bearing and to the lower king pin bearing.

22. As an article of manufacture, a king pin adapted to be fixed in an axle eye and protrude on both sides thereof, to have the upper and lower protruding ends thereof serving as inner bearing elements and to be encircled by a thrust bearing above its lower bearing surface, having an upper reduced end, an axial bore extending from the top of the king pin to a short distance away from the bottom thereof, a circumferential groove at the level of the thrust bearing and radial bores between said axial bore and said groove.

23. In a vehicle of the type including an axle and a steering knuckle having a pivotal mount thereon including a king pin; the combination therewith of a lubricating installation for associated bearings about said steering knuckle, a lubricant source at the top of the king pin, an axial bore through the king pin and a well at the top of the king pin, said bore and said well being supplied in parallel from said source and in turn supplying lubricant to the upper and lower king pin bearings respectively.

24. In a dividing arrangement for a plurality of bearings supplied by a gravity lubricant system, in combination, a distribution receiver, an inlet tube extending upwardly to and communicating with the said receiver, an annular outlet receiver around said tube communicating with the bottom of the receiver, means to admit lubricant to the inlet tube, means to remove lubricant from said annular outlet receiver below the bottom of said chamber to supply one bearing and means to remove lubricant directly from the side of said receiver to supply another bearing, the width of said annular receiver being so proportioned as to ensure proper division of lubricant to said bearings.

25. In a dividing arrangement for a plurality of bearings supplied by a gravity lubricant system, in combination, a substantially vertical inlet tube, a relatively wide annular trough encircling the top of said inlet tube, a relatively narrow annular receiver encircling an intermediate portion of said tube and communicating with the bottom of said annular trough, means to admit lubricant to the inlet tube below said annular receiver, means to remove lubricant from said annular receiver below the bottom of said annular trough but above said admitting means and additional means to remove lubricant from said annular trough, the inlets of said additional means and of said annular receiver being of such proportionate areas and so positioned in respect to the annular trough as to ensure proper division therebetween.

26. In a ball stud of the type in which the ball stud is adapted to be placed in upright position with its shank extending downwardly; the combination therewith of a lubricating installation comprising a radial bore in said shank, an axial bore communicating with said radial bore and extending to the top of said ball, the upper portions of which are enlarged, a tube fitted into said axial bore above said radial bore closely fitting the unenlarged portions of said axial bore, spaced from the enlarged portions of said axial bore to form an annular chamber and adapted to feed lubricant into said annular chamber and another radial bore in said shank communicating with said annular chamber.

27. In a motor vehicle of the type including an axle and a steering knuckle having a pivotal mount thereon and carrying drag link and tie rod bearings; the combination therewith of a lubricant installation for said drag link and tie rod bearings comprising a distributing receiver adjacent the top of the pivotal mount, a conduit with a single inlet from said receiver leading to the uppermost of said bearings, another conduit leading from the uppermost of said bearings to the lowermost of said bearings and dividing means at the uppermost of said bearings connecting the outlet of the first mentioned conduit with the inlet of the second mentioned conduit serving to divide the lubricant between said bearings.

28. In a motor vehicle of the type including an axle and a steering knuckle having a pivotal mount thereon and having a depending arm rigid therewith carrying both drag link and tie rod bearings, the tie rod bearing being at a lower level than the drag link bearing; the combination therewith of a lubricant installation for the drag link and tie rod bearings comprising a lubricant source at the top of the pivotal mount, a conduit system supported by said arm leading first to the drag link bearing and then to the tie rod bearing and a concentric dividing arrangement positioned at the drag link bearing and passing some of the lubricant past said drag link bearing to the tie rod bearing.

29. In a motor vehicle, in combination, an axle, a knuckle having an arm rigid therewith carrying a bearing, a lubricant inlet fast to said axle, a swivel connection between said knuckle and a part rigid with said axle, a conduit carried by said knuckle and in fluid intercepting relationship with lubricant from said inlet, part of said conduit extending generally along said arm to said bearing and a substantially dust-tight vent maintaining the upper part of said conduit along said arm under atmospheric pressure, said conduit being of diameter too small to permit passage of lubricant about any air therein.

30. A steering knuckle comprising, in combination, bearings at different levels, a lubricant inlet to said knuckle, means carried by said knuckle dividing the lubricant delivered to said bearings and a vent near the dividing means to maintain atmospheric pressure on the lubricant.

31. The combination of an axle, a knuckle having a clevis straddling said axle, a king pin fixed in said axle and affording a bearing for said knuckle, said king pin extending upward beyond the upper end of said knuckle, an integral ledge coaxial with the upper end of said knuckle, an annular compression gasket encircling said ledge, a lubricant supply cap secured to said protruding end of the king pin and having a downwardly extending annular flange encircling the gasket.

32. In combination, a relatively fixed structure, a structure swiveled thereto and carrying a bearing at level below a portion of the swivel bearing therefor, a passageway on said swiveled structure extending downward from the mount thereof to said bearing and at least in part of diameter too small to permit gravity flow of lubricant therethrough about any air therein, means to prevent foreign matter from entering the passageway at said swivel, said means rendering the construction substantially air-tight during operation, and a port venting a part of said passageway, a receiving chamber being provided to feed said passageway, said port being associated with said chamber and venting said chamber substantially above the lower portion thereof.

33. In a lubricating installation, in combination, a pair of bearings at different levels, an inlet at level higher than said bearings for supplying the higher of them and a substantially vertically extending outlet conduit for delivering from the higher down to the lower of said bearings, of diameter too small to permit passage of lubricant about any air therein and vented near the commencement thereof, the outlet conduit being provided with a vent substantially above the higher bearing.

34. In a lubricating installation, in combination, a pair of bearings at different levels, an inlet at level higher than said bearings for supplying the higher of them and a substantially vertically extending outlet conduit for delivering from the higher down to the lower of said bearings, of diameter too small to permit passage of lubricant about any air therein and vented near the commencement thereof, said bearings consisting in part of central elements and encircling elements and said vent extending laterally through an encircling element.

35. In a vehicle of the type including an axle and a steering knuckle having a pivotal mount thereon; the combination therewith of a lubricating installation for associated bearings about said steering knuckle, a conduit system including separate conduits along the outside and through the inside of the pivotal mount conveying lubricant to associated bearings, a lubricant source adjacent the upper part of the pivotal mount and collectors adjacent the upper and lower portions, one associated with each of said separate conduits of said pivotal mount receiving lubricant from said source and dispensing it, respectively, to said bearings by said conduit system, the collector associated with the outside conduit being positioned at the initial portion of said outside conduit, and the collector associated with the inside conduit being positioned substantially at the termination of said inside conduit.

Signed at New York city in the county of New York and State of New York this 13th day of August, A. D. 1925.

JOSEPH BIJUR.